(12) United States Patent
Hadsall, Sr.

(10) Patent No.: US 9,106,810 B1
(45) Date of Patent: Aug. 11, 2015

(54) MARITIME SAFETY SYSTEMS FOR CREW AND PASSENGERS

(71) Applicant: MTN Satellite Communications, Seattle, WA (US)

(72) Inventor: Richard A Hadsall, Sr., Miami, FL (US)

(73) Assignee: MTN Satellite Communications Inc., Seattle, WA (US)

( * ) Notice: Subject to any disclaimer, the term of this patent is extended or adjusted under 35 U.S.C. 154(b) by 0 days.

(21) Appl. No.: 14/300,187

(22) Filed: Jun. 9, 2014

Related U.S. Application Data (60) Provisional application No. 61/832,888, filed on Jun. 9, 2013.

(51) Int. Cl.
*H04N 7/18* (2006.01)

(52) U.S. Cl.
CPC ................................. *H04N 7/181* (2013.01)

(58) Field of Classification Search
CPC ..................................................... H04N 7/181
See application file for complete search history.

(56) References Cited

U.S. PATENT DOCUMENTS

| | | | | |
|---|---|---|---|---|
| 5,293,094 | A * | 3/1994 | Flynn et al. | 310/323.11 |
| 5,555,518 | A * | 9/1996 | Whalen et al. | 367/4 |
| 6,082,675 | A * | 7/2000 | Woodall et al. | 244/137.4 |
| 6,847,326 | B2 * | 1/2005 | Harigae et al. | 342/357.57 |
| 8,384,780 | B1 * | 2/2013 | Frank et al. | 348/148 |
| 2010/0138644 | A1 * | 6/2010 | Yannacone et al. | 713/150 |
| 2012/0105638 | A1 * | 5/2012 | Englander | 348/148 |
| 2014/0142845 | A1 * | 5/2014 | Fueller et al. | 701/461 |

* cited by examiner

*Primary Examiner* — Sath V Perungavoor
*Assistant Examiner* — Kate Luo
(74) *Attorney, Agent, or Firm* — FSP LLC (57) ABSTRACT

A fall detection and recovery system includes cameras positioned around a perimeter of a vessel. The system analyzes video from the cameras to detect a falling object from the vessel and records a geolocation of the vessel at a time of falling of the object. The system applies environmental readings to evolve a recovery location for the falling object from the time of falling to a present time.

15 Claims, 12 Drawing Sheets

MARITIME SAFETY SYSTEMS FOR CREW AND PASSENGERS

CROSS-REFERENCE TO RELATED APPLICATIONS

This application claims benefit and priority under 35 U.S.C. 119 to U.S. application Ser. No. 61/832,888, filed on Jun. 9, 2013 and incorporated herein by reference in its entirety.

BACKGROUND OF THE INVENTION

In the mass market pleasure cruise industry alone, hundreds of people fall overboard every year and are never rescued or recovered. Usually the events are not even noticed in real-time but are only discovered long after the fact when someone is reported missing.

BRIEF SUMMARY OF THE INVENTION

A system includes a plurality of cameras positioned around a perimeter of a vessel. The system includes logic to analyze video from the cameras to detect a falling object from the vessel, and logic to record a geolocation of the vessel at a time of falling of the object. The system includes logic to apply environmental readings to evolve a recovery location for the falling object from the time of falling to a present time.

The system may further include logic to apply wind and current measurements on an ongoing basis to evolve the recovery location. The system may cause the ejection of dye into water around the vessel in a zone where the object was detected to be falling. The system may include an aerial drone configured to assist in location and recovery of the falling object. The system may cause the launch of a buoy having flotation characteristics modeled after a human. The system may provide a video loop having a start time preceding the time of falling and an end time after the time of falling.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION OF THE INVENTION

Glossary

"Alert" in this context refers to logic implementing communication that provides notification of an elapsed time or of an event. Examples are auditory alarms, optical indications such as flashing or activated lights, text messages, vibrations, and emails.

"Camera" in this context refers to a device that includes a light collecting chamber with an aperture fitted with a lens through which the image of an object is projected onto a surface for recording or conversion into electrical or optical signals.

"GPS" in this context refers to (Global Positioning System) logic to interact with multiple geosynchronous satellites to determine a terrestrial location. (Global Positioning System) a space-based satellite navigation system that provides location and time information in most weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver. The global positioning system is a location determination network that uses satellites to act as reference points for the calculation of position information.

"H.264" in this context refers to a video compression format that is currently one of the most commonly used formats for the recording, compression, and distribution of video content. The final drafting work on the first version of the standard was completed in May 2003, and various extensions of its capabilities have been added in subsequent editions. H.264/MPEG-4 AVC is a block-oriented motion-compensation-based video compression standard developed by the ITU-T Video Coding Experts Group (VCEG) together with the ISO/IEC JTC1 Moving Picture Experts Group (MPEG). The project partnership effort is known as the Joint Video Team (JVT). The ITU-T H.264 standard and the ISO/IEC MPEG-4 AVC standard (formally, ISO/IEC 14496-10—MPEG-4 Part 10, Advanced Video Coding) are jointly maintained so that they have identical technical content.

"IR" in this context refers to (infrared) electromagnetic radiation with longer wavelengths than those of visible light, extending from the nominal red edge of the visible spectrum at 0.74 micrometers to 0.3 mm. This range of wavelengths corresponds to a frequency range of approximately 430 down to 1 THz, [1] and includes most of the thermal radiation emitted by objects near room temperature.

"Sensor" in this context refers to a device or composition of matter that responds to a physical stimulus (as heat, light, sound, pressure, magnetism, or a particular motion) and transmits a resulting impulse (as for measurement or operating a control).

"Video" in this context refers to information captured and stored by a device representing a sequence of moving pictures. Video may be captured, stored, and communicated by devices in either analog or digital formats. (1) Refers to recording, manipulating, and displaying moving images, especially in a format that can be presented on a television. (2) Refers to displaying images and text on a computer monitor or mobile device. The video adapter, for example, is responsible for sending signals to the display device. (n.) A recording produced with a video recorder (camcorder) or some other device that captures full motion.

DESCRIPTION

Embodiments of a man overboard system are described which automatically detect the event of any large object falling overboard of a watercraft (e.g., ship or large boat). The system discriminates between persons and objects. The system includes both automated responses to detected overboard events, and responses mediated by human judgement based on data gathered, processed, and presented by the system.

The system detects possible overboard events in real-time. The system automatically initiates certain responses, such as injecting fluorescent dye into the water to mark the location of a probable event, and a tracking process to predict the future location of a floating body having landed in the sea at the time and location of a detected event. The system presents to a human user an alarm and a video instant replay of probable events to allow the human to order further responses such as turning a ship around.

One embodiment of the system (which may be employed on cruise ships) comprises 10 camera zones, forming detection zones that cover the full length of the ship and aft sections. Thermal imaging cameras (day/night/weather) may be utilized. Video analysis is provided separately for each camera to play (for example) 5 seconds prior and post to a recorded incident. The video analysis may utilize digital video stabilization. Utilizing this system the position of a fall may be pinpointed quickly to a specific coverage zone. All video is recorded and sensor alarms flagged upon detection of a fall.

Analysis may be performed to identify the incident and identify the "zone" where the incident occurred. The system may provide real time on-board alert management with GPS tagged interface, advanced video and IR analytics for detection, and zone Identification. Alerts may be sent to the bridge and/or control room of the ship, with optional remote alerts sent to fleet headquarters. Full video playback may be provided with H.264 and high resolution. The system utilizes background modeling algorithms to compensate for water movement and ship movement. The system can be utilized without calibration, 'sees' objects in 3D, has a large field of view, and is unaffected by normal ranges of expected temperature or weather.

The system automatically determines a recovery radius for the overboard person using multi-step location analysis. An initial GPS position is recorded on occurrence of a fall alarm. The recovery radius is then updated as time to recovery passes. Location algorithms calculates a radius of possible recovery location utilizing factors such as GPS, wind, currents, and offsets from the ship. A projected passenger location is identified and sent to relevant parties/systems. Optionally the system may deploy a safety and locator buoy. The system may optionally utilize FLIR cameras with thermal and tracking capabilities.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

DRAWINGS

Figure 1:
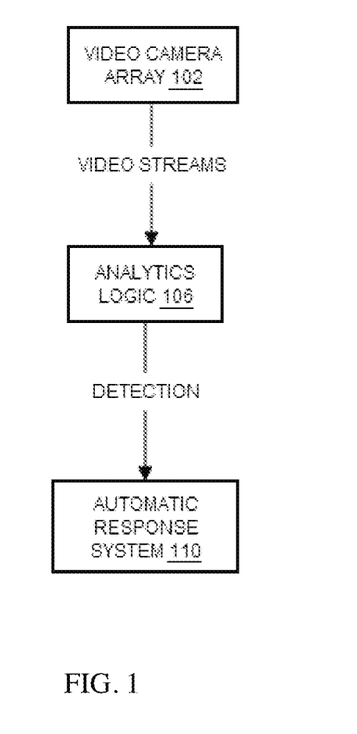
FIG. 1 is a system diagram of an embodiment of an overboard event detection.
Figure 2:
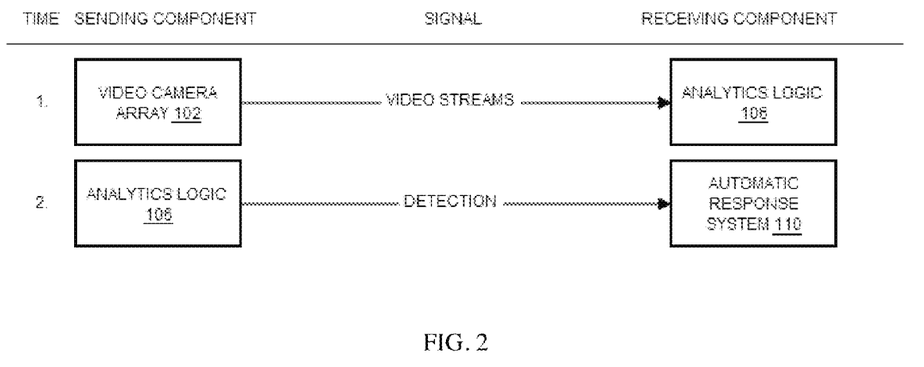
FIG. 2 is an action flow diagram of an embodiment of an overboard event detection process.
Figure 3:
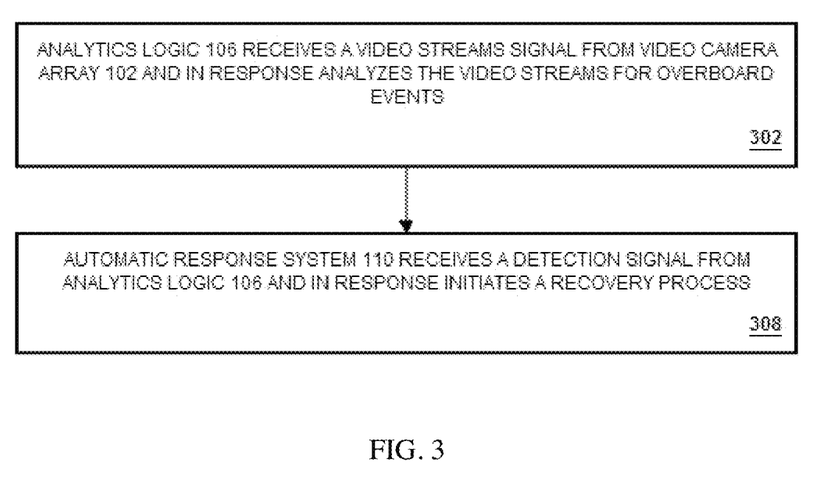
FIG. 3 is a flow chart of an embodiment of an overboard event detection process.

FIG. 1 is a system diagram of an embodiment of an overboard event detection. FIG. 2 is an action flow diagram of an embodiment of an overboard event detection process. FIG. 3 is a flow chart of an embodiment of an overboard event detection process. Collectively, these drawings illustrate a system and process to detect and respond to overboard events.

The system comprises video camera array 102, analytics logic 106, and automatic response system 110. The analytics logic 106 receives video streams from the video camera array 102 and in response analyzes the video streams for overboard events (302). The automatic response process 110 receives a detection signal from the analytics logic 106 and in response initiates a recovery process (308).

The array of video cameras 102 encircles a ship, providing a 360 degree view of a plane through which any person falling off a deck would pass. The cameras are sensitive to both visible and infrared light. The analytics logic compensates for vessel and sea motion and recognizes persons in the field of view utilizing machine vision logic. The automatic response system 110 triggers all steps the are to follow automatically once a detection is reported by the analytics logic.

Figure 4:
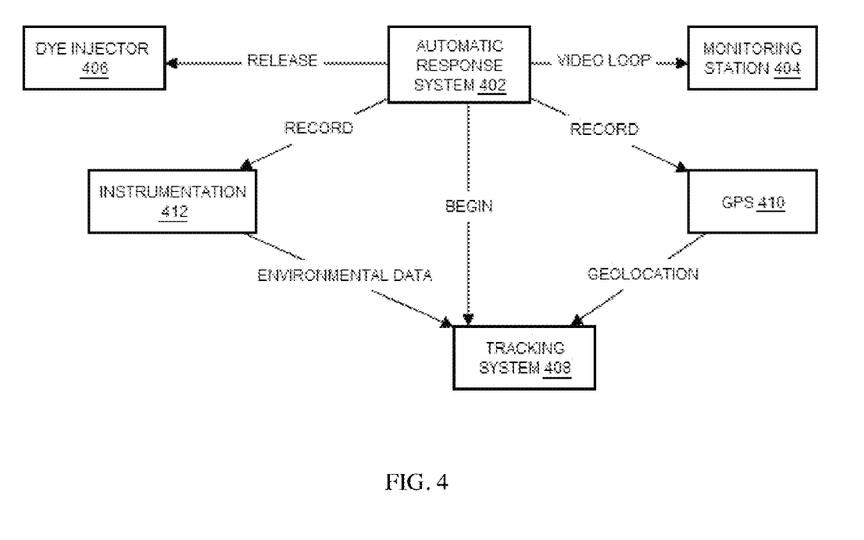
FIG. 4 is a system diagram of an embodiment of an automatic responses to a man overboard detection.
Figure 5:
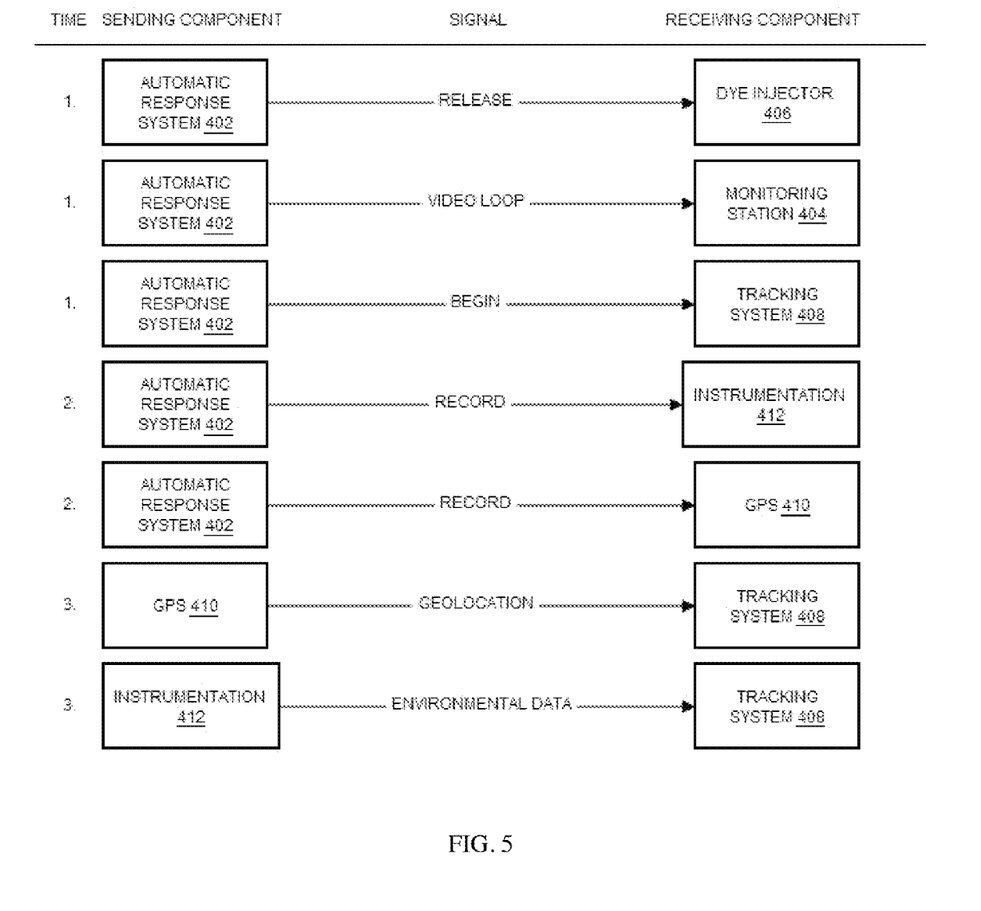
FIG. 5 is an action flow diagram of an embodiment of an automatic responses to a man overboard detection process.
Figure 6:
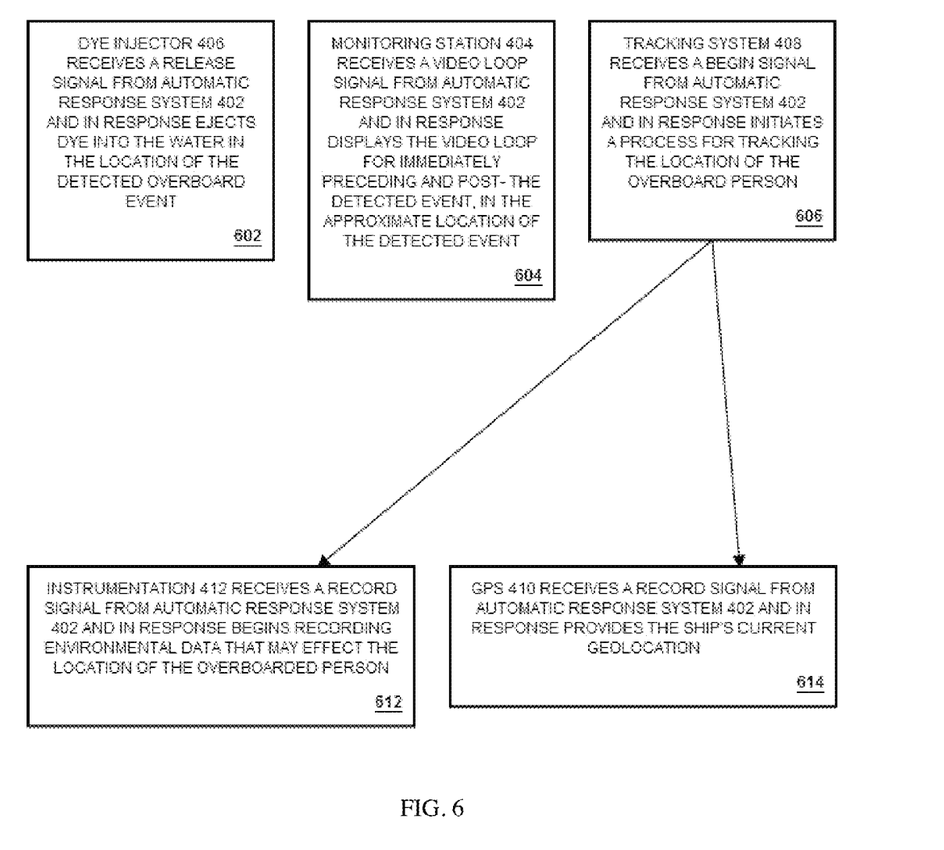
FIG. 6 is a flow chart of an embodiment of an automatic responses to a man overboard detection process.
Figure 7:
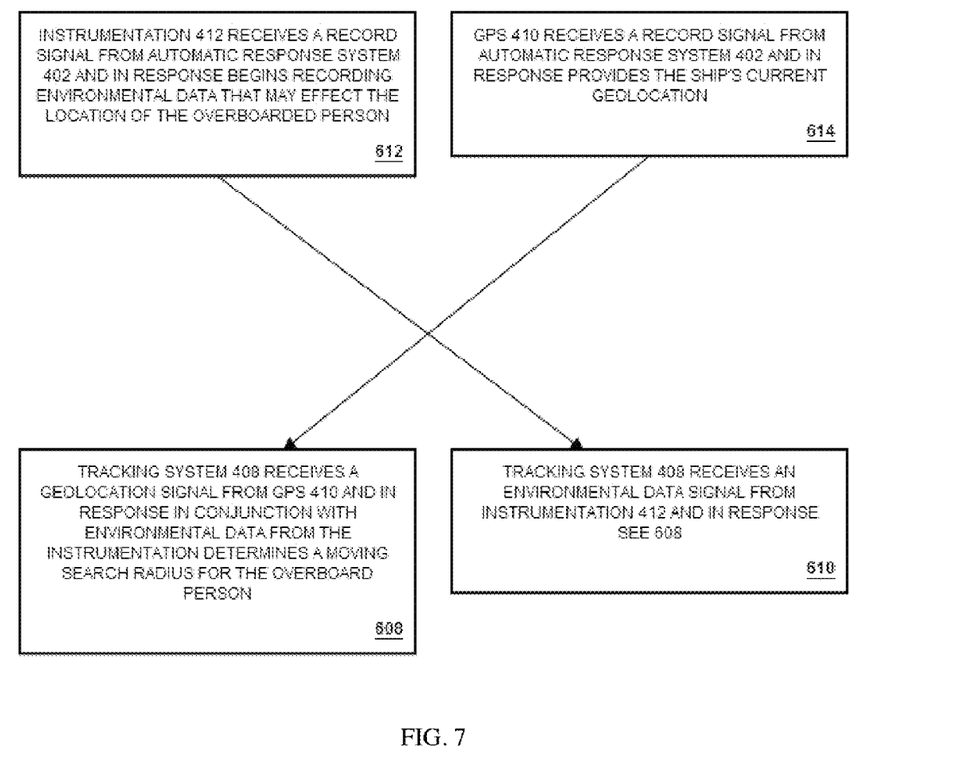
FIG. 7 is a flow chart of an embodiment of an automatic responses to a man overboard detection process.

FIG. 4 is a system diagram of an embodiment of an automatic responses to a man overboard detection. FIG. 5 is an action flow diagram of an embodiment of an automatic responses to a man overboard detection process. FIG. 6-7 is a flow chart of an embodiment of an automatic responses to a man overboard detection process. Collectively, these drawings illustrate a process of detecting and tracking an overboard person for purposes of recovery.

The system comprises automatic response system 402, monitoring station 404, dye injector 406, tracking system 408, gps 410, and instrumentation 412. The dye injector 406 receives a release signal from the automatic response system 402 (due to detection of a person or large object overboard) and in response ejects dye into the water in the location of the detected overboard event (602). The dye injector injects a volume of high contrast dye and fluorescent into the water. This enables the patch of water into which a person has fallen to be visible from the air by day and by night when illuminated by ultraviolet light. The patch of water and person will most likely move in unison and remain overlapping for some time, unless the person swims away.

The monitoring station 404 receives a video loop from the automatic response system 402 and in response displays the video loop for immediately preceding and post- the detected event, in the approximate location of the detected event (604). A human operator may then determine if the overboard object is a person or some other large object, such as deck furniture. The monitoring station is a video station, typically on the bridge, visible to the officers on watch. From this station a person can see a continuously looping video of a view focused on a probable event.

If the overboard object is determined to be a person (to some probability), the tracking system 408 receives a begin signal from the automatic response system 402 and in response initiates a process for tracking the location of the overboard person (606). The instrumentation 412 receives a record signal from the automatic response system 402 and in response begins recording environmental data that may effect the location of the overboarded person (612). The instrumentation gathers data on wind, currents, sea state, and other environmental data relevant to predicting the track of a man overboard. The GPS 410 receives a record signal from the automatic response system 402 and in response provides the ship's current geolocation (614), at or close to the moment the overboard event is detected.

The tracking system 408 receives the geolocation signal from the GPS 410 and in response, in conjunction with environmental data received from the instrumentation 412, determines a moving search radius for the overboard person (608). The tracking system 408 predicts the center and radius of a circle in which a floating body should remain with a certain probability as time passes from the initial event.

Figure 8:
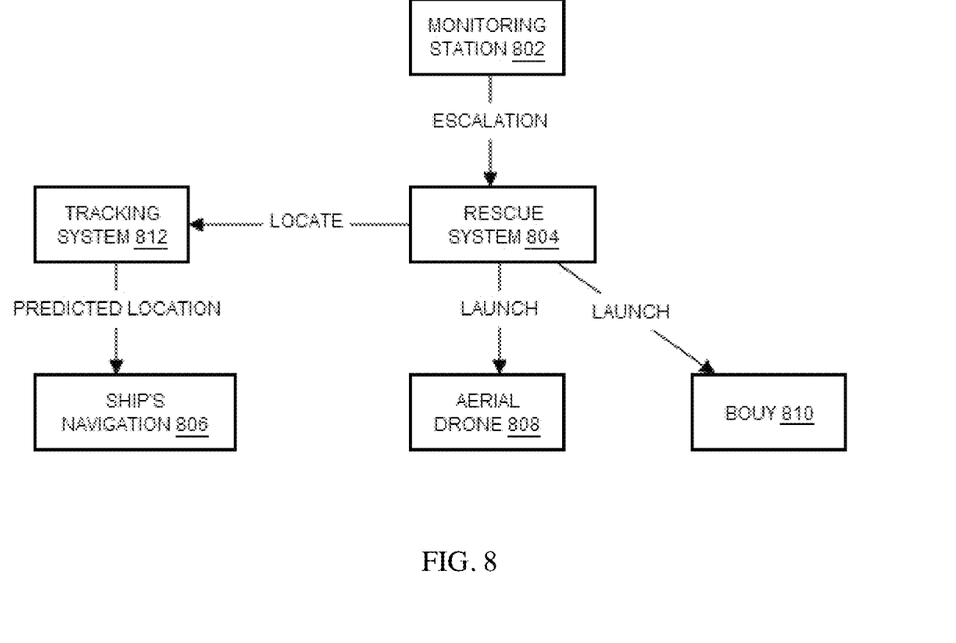
FIG. 8 is a system diagram of an embodiment of a tracking and rescue system for an overboard person.
Figure 9:
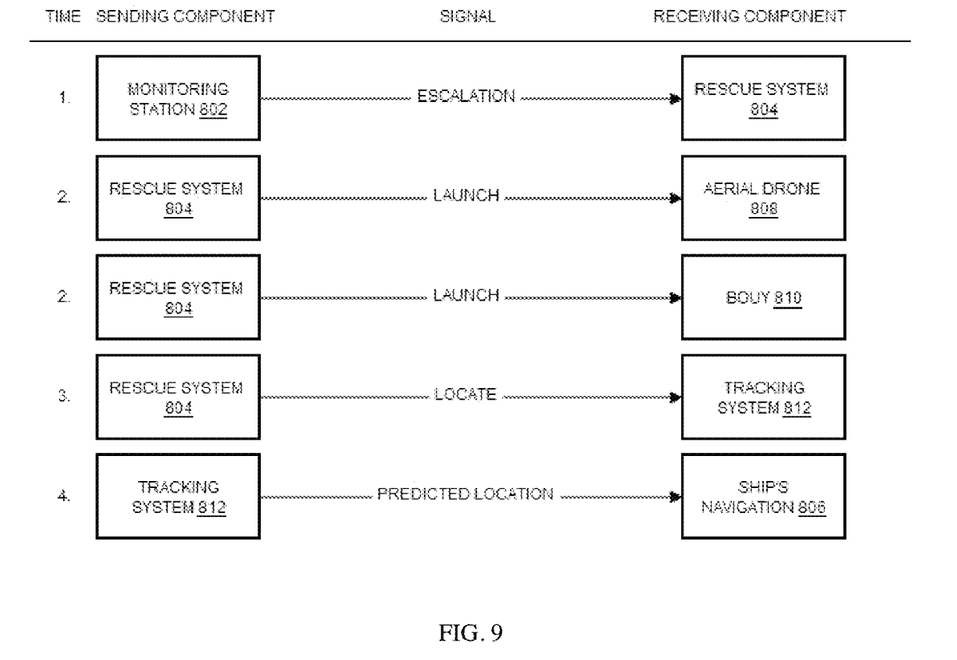
FIG. 9 is an action flow diagram of an embodiment of a tracking and rescue process for an overboard person.
Figure 10:
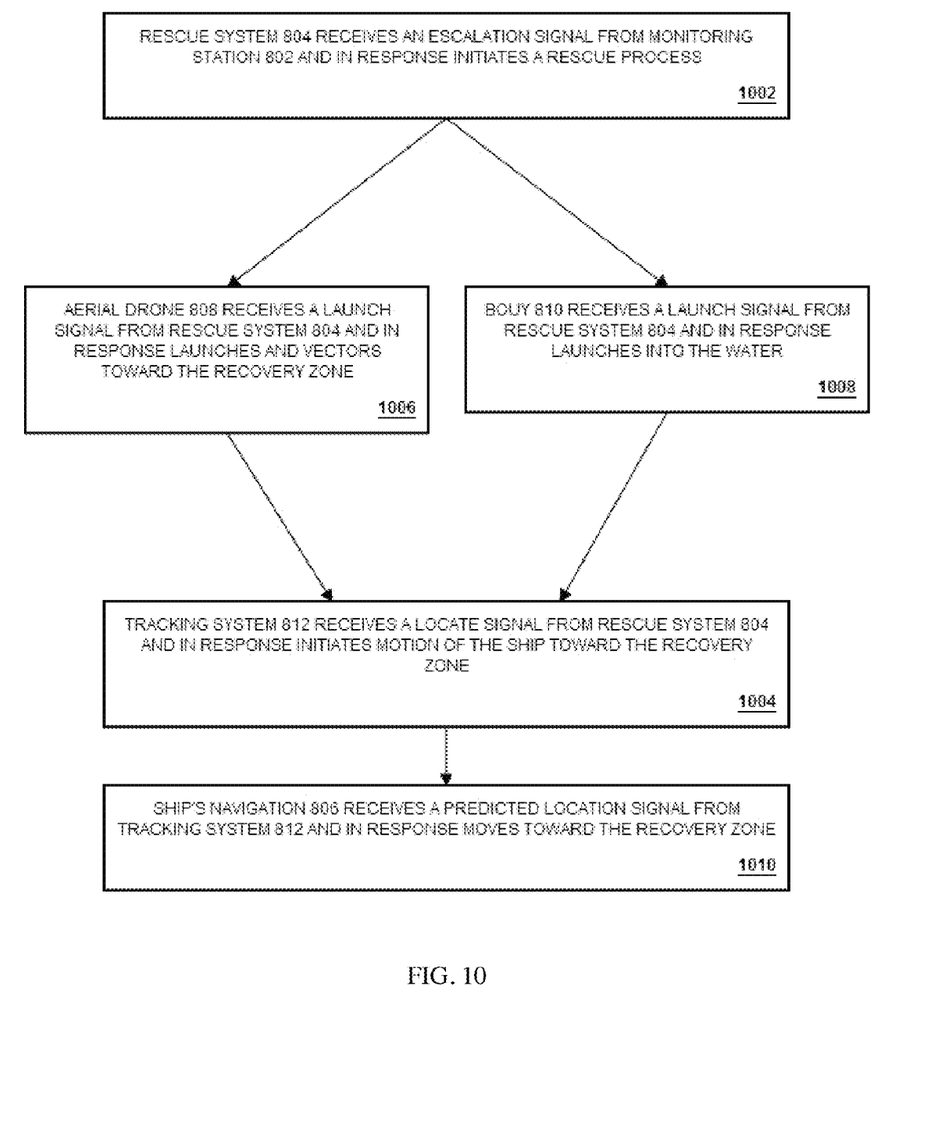
FIG. 10 is a flow chart of an embodiment of a tracking and rescue process for an overboard person.

FIG. 8 is a system diagram of an embodiment of a tracking and rescue system for an overboard person. FIG. 9 is an action flow diagram of an embodiment of a tracking and rescue process for an overboard person. FIG. 10 is a flow chart of an embodiment of a tracking and rescue process for an overboard person. The system comprises monitoring station 802, rescue system 804, ship's navigation 806, aerial drone 808, bouy 810, and tracking system 812.

The rescue system 804 receives an escalation signal from the monitoring station 802 and in response initiates a rescue process (1002). This process involves the launch of devices to assist in identifying the recovery zone with certainty. For example, in one embodiment an aerial drone 808 receives a launch signal from the rescue system 804 and in response launches and vectors toward the recovery zone (1006). The drone 808 may comprise an automated, unmanned aircraft to seek out the man overboard from the air and transmit that information. It may also provide a means to communicate two way between the ship and man overboard while a rescue is in process. A bouy 810 may also receive a launch signal from the rescue system 804 and in response launches into the water (1008). The bouy 810 is a floating item with the drag characteristics of a human body, equipped with signaling systems (light, radio, sound).

The tracking system 812 receives a locate signal (e.g., predicted location of recovery zone based on time passed and environmental conditions) from the rescue system 804 and in response signals the ship with a predicted location of the recovery zone (1004). The ship's navigation 806 receives a predicted location signal from tracking system 812 and in response moves toward the recovery zone (1010).

Figure 11:
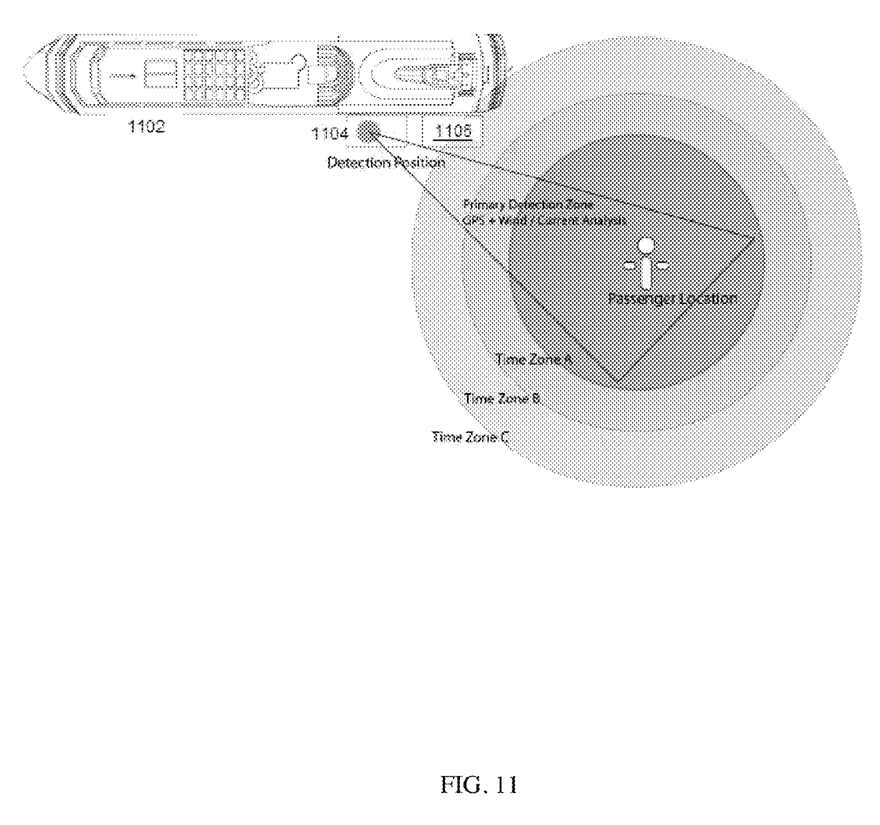
FIG. 11 is a figure describing an embodiment of a recovery zone prediction system for determining the location of overboard persons

FIG. 11 illustrates an embodiment of a recovery zone prediction system. A ship 1102 comprises detection zones 1104, 1106 for overboard events. An overboard event is initially detected at a detection position, and a GPS reading is taken for the ship and adjusted to the detection position (e.g., by applying a geometry and orientation of the ship relative to the GPS receiver on the ship and the detection position). The recovery zone evolves as time passes, so that initially the zone is A, evolving to B, then to C. A passenger location is predicted to be somewhat central to the recovery zone.

Figure 12:
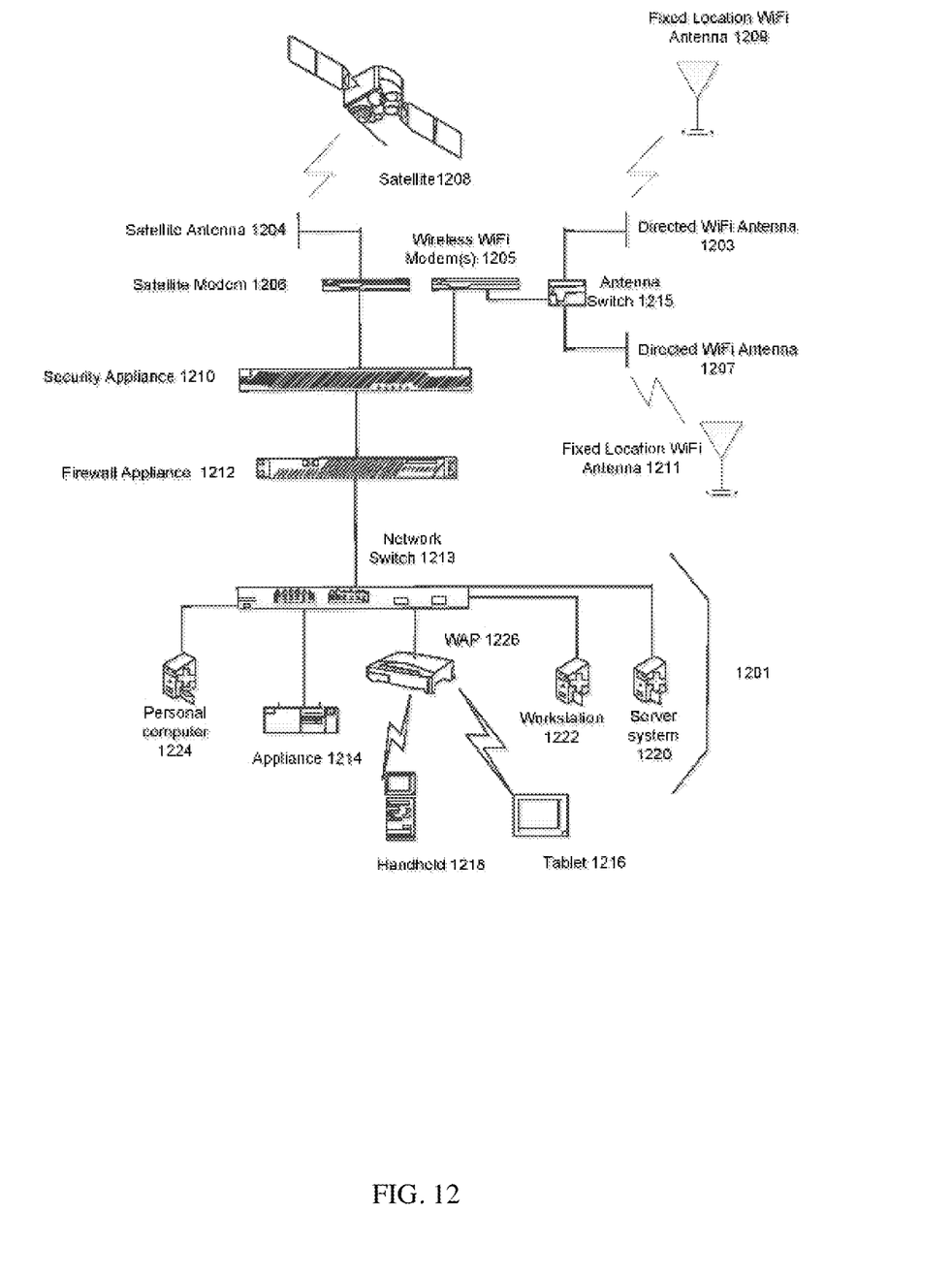
FIG. 12 is a figure describing a machine system embodiment to implement overboard detection and reaction

FIG. 12 illustrates an embodiment of a machine internetworking system that may be utilized to implement a overboard detection and response system as described herein. Communication is carried out between devices of a local area network (LAN) 1201 and a wide area network (WAN) (e.g., the Internet) via a satellite antenna 1204 and satellite 1208. The LAN 1201 includes server systems 1220, personal computers 1224, appliances 1214, tablets 1216, handheld (mobile) devices 1218, and workstations 1222. A WAP 1226 provides wireless access to the LAN 1201. Of course, a typical LAN includes other devices as well, such as printers, faxes, scanners, etc. The networks are bridged via a system of devices including (in this example) a satellite modem 1206, a security appliance 1210, a firewall appliance 1212, and a network switch 1218. The security appliance 1210 (e.g., Cisco 5510) provides, for example, firewall and VPN (virtual private network) concentration, intrusion detection, and intrusion prevention. The firewall appliance 1212 (e.g., Barracuda) provides, for example, anti-virus and anti-fishing protection for the LAN 1201, and web, email, and file content filtering. Communication traffic is switched between the LAN 1201 and the WAN by a network switch 1218. The WAN may also be accessed in some circumstances via WiFi (e.g., wireless proximity to one or more fixed location WiFi antennas 1209 and 1211). A WiFi 'modem' 1205 may provide signals to an antenna switch 1215, which in turn provides the signals to one or more directed WiFi antennas 1203,1207. The signals are communicated to and from the antennas 1203, 1207 using WiFi to one or more fixed location WiFi antennas 1209 and 1211.

What is claimed is:

1. A system comprising:
a plurality of cameras positioned around a vessel perimeter;
logic to analyze video from the cameras to detect a falling object at the vessel perimeter;
logic to record a vessel geolocation at a time of falling of the falling object; and
logic to apply wind and current measurements on an ongoing basis to evolve a recovery radius for the falling object from the time of falling of the falling object to a present time.

2. The system of claim 1, further comprising:
logic to cause the ejection of dye into water around the vessel in a fall zone where the falling object was detected at the time of falling of the falling object.

3. The system of claim 1, further comprising:
an aerial drone configured to assist in location and recovery of the falling object by launching from the vessel perimeter at a time proximate to the time of falling of the falling object.

4. The system of claim 1, further comprising:
logic to cause launch of a buoy having human flotation characteristics at a time proximate to the time of falling of the falling object.

5. The system of claim 1, further comprising:
logic to provide a video loop having a video loop start time preceding the time of falling of the falling object and a video loop end time after the time of falling of the falling object.

6. A method comprising:
operating a plurality of cameras positioned around a vessel perimeter;
analyzing video from the cameras to detect a falling object at the vessel perimeter;
recording a vessel geolocation at a time of falling of the falling object; and
applying wind and current measurements on an ongoing basis to evolve a recovery radius for the falling object from the time of falling of the falling object to a present time.

7. The method of claim 6, further comprising:
ejecting dye into water around the vessel in a fall zone where the falling object was detected at the time of falling of the falling object.

8. The method of claim 6, further comprising:
launching an aerial drone from the vessel perimeter at a time proximate to the time of falling of the falling object.

9. The method of claim 6, further comprising:
launching a buoy having human flotation characteristics at a time proximate to the time of falling of the falling object.

10. The method of claim 6, further comprising:
displaying a video loop having a video loop start time preceding the time of falling of the falling object and a video loop end time after the time of falling of the falling object.

11. A non-transitory computer-readable storage medium having stored thereon instructions including instructions that, when executed by a processor, configure the processor to perform a method comprising:
operating a plurality of cameras positioned around a vessel perimeter;
analyzing video from the cameras to detect a falling object at the vessel perimeter;
recording a vessel geolocation at a time of falling of the falling object; and
applying wind and current measurements on an ongoing basis to evolve a recovery radius for the falling object from the time of falling of the falling object to a present time.

12. The non-transitory computer-readable storage medium of claim 11, the method further comprising:
ejecting dye into water around the vessel in a fall zone where the falling object was detected at the time of falling of the falling object.

13. The non-transitory computer-readable storage medium of claim 11, the method further comprising:
launching an aerial drone from the vessel perimeter at a time proximate to the time of falling of the falling object.

14. The non-transitory computer-readable storage medium of claim 11, the method further comprising:
launching a buoy having human flotation characteristics at a time proximate to the time of falling of the falling object.

15. The non-transitory computer-readable storage medium of claim 11, the method further comprising:
displaying a video loop having a video loop start time preceding the time of falling of the falling object and a video loop end time after the time of falling of the falling object.

* * * * *